United States Patent
Khemka et al.

(10) Patent No.: US 11,886,789 B1
(45) Date of Patent: Jan. 30, 2024

(54) BLOCK DESIGN CONTAINERS FOR CIRCUIT DESIGN

(71) Applicant: Xilinx, Inc., San Jose, CA (US)

(72) Inventors: Ayush Khemka, San Jose, CA (US); Srinivas Beeravolu, Los Gatos, CA (US); Kalyani Tummala, San Jose, CA (US); Jaipal Reddy Nareddy, Hyderabad (IN); Adithya Balaji Boda, Hyderabad (IN); Suman Kumar Timmireddy, Hyderabad (IN)

(73) Assignee: Xilinx, Inc., San Jose, CA (US)

( * ) Notice: Subject to any disclaimer, the term of this patent is extended or adjusted under 35 U.S.C. 154(b) by 97 days.

(21) Appl. No.: 17/369,192

(22) Filed: Jul. 7, 2021

(51) Int. Cl.
*G06F 30/392* (2020.01)
*G06F 30/398* (2020.01)
*G06F 111/20* (2020.01)

(52) U.S. Cl.
CPC .......... *G06F 30/392* (2020.01); *G06F 30/398* (2020.01); *G06F 2111/20* (2020.01)

(58) Field of Classification Search
CPC ...... G06F 30/33; G06F 30/398; G06F 30/392; G06F 30/327; G06F 30/30; G06F 2119/06; G06F 30/39; G06F 12/0607; G06F 15/17375; G06F 30/331; G06F 30/367; G06F 2119/18; G06F 30/394; G06F 11/221; G06F 30/3323; G06F 30/00; G06F 30/20; G06F 2111/20; G06F 30/3308; G06F 11/1004; G06F 2119/02; G06F 2119/12; G06F 30/31; G06F 30/3312; G06F 1/08; G06F 11/261; G06F 16/24; G06F 16/252; G06F 2111/04; G06F 2117/02; G06F 30/396; G06F 1/06; G06F 11/3636; G06F 11/3692; G06F 2111/02; G06F 2111/06; G06F 2111/10; G06F 2111/12; G06F 2113/18; G06F 2113/20; G06F 2115/08; G06F 2117/08; G06F 2119/20; G06F 2119/22; G06F 3/0482; G06F 30/27; G06F 30/333; G06F 30/337; G06F 30/34; G06F 30/373; G06F 30/38; G06F 30/3953; G06F 8/315; G06F 8/47; G03F 1/36;
(Continued)

(56) References Cited

U.S. PATENT DOCUMENTS

| 6,507,211 | B1 | 1/2003 | Schultz et al. |
| 6,525,562 | B1 | 2/2003 | Schultz et al. |
| 6,526,557 | B1 | 2/2003 | Young et al. |

(Continued)

OTHER PUBLICATIONS

Koch, D. et al., "Hierarchical reconfiguration of FPGAs," In 24th Int'l. Conf. on Field Programmable Logic and Applications (FPL), Technical University of Munich (TUM), Sep. 2, 2014, pp. 1-8.
(Continued)

*Primary Examiner* — Binh C Tat
(74) *Attorney, Agent, or Firm* — Kevin T. Cuenot

(57) ABSTRACT

Circuit design development using block design containers can include opening, within a development environment generated by an Electronic Design Automation (EDA) system, a top-level block design specifying a circuit design and inserting, within the top-level block design using the EDA system, a block design container. The block design container specifies a source block design used as a sub-design within the top-level block design.

20 Claims, 9 Drawing Sheets

(58) Field of Classification Search
CPC ............ C12Q 1/6883; C12Q 2600/106; C12Q 2600/158; C12Q 2600/178
USPC .................................................. 716/100–106
See application file for complete search history.

(56) References Cited

U.S. PATENT DOCUMENTS

| | | | |
|---|---|---|---|
| 6,573,748 B1 | 6/2003 | Trimberger | |
| 6,625,794 B1 | 9/2003 | Trimberger | |
| 6,678,646 B1 | 1/2004 | McConnell | |
| 6,907,595 B2 | 6/2005 | Curd et al. | |
| 7,109,750 B2 | 9/2006 | Vadi et al. | |
| 7,138,820 B2 | 11/2006 | Goetting et al. | |
| 7,218,137 B2 | 5/2007 | Vadi et al. | |
| 7,233,532 B2 | 6/2007 | Vadi et al. | |
| 7,235,999 B2 | 6/2007 | Goetting et al. | |
| 7,599,299 B2 | 10/2009 | Goetting et al. | |
| 7,640,526 B1 | 12/2009 | Blodget | |
| 7,739,092 B1 | 6/2010 | Ballagh | |
| 7,954,078 B1 * | 5/2011 | Wang ................... | G06F 30/327 716/120 |
| 8,719,750 B1 | 5/2014 | Balzli, Jr. | |
| 9,218,443 B1 | 12/2015 | Styles et al. | |
| 9,590,635 B1 | 3/2017 | Sengupta | |
| 10,055,529 B1 * | 8/2018 | Ginetti ................. | G06F 30/392 |
| 10,608,641 B2 | 3/2020 | Yu | |
| 10,621,299 B1 | 4/2020 | Yu | |
| 10,719,650 B1 * | 7/2020 | Sanders ................. | G06F 30/39 |
| 2002/0073380 A1 | 6/2002 | Cooke | |
| 2009/0030665 A1 * | 1/2009 | Kerns ................... | G06F 30/367 703/14 |
| 2012/0284501 A1 | 11/2012 | Zievers | |
| 2013/0097573 A1 * | 4/2013 | Kim ...................... | G06F 30/392 716/119 |
| 2014/0282338 A1 * | 9/2014 | Nayak ................... | G06F 30/394 716/120 |
| 2016/0132441 A1 | 5/2016 | Styles et al. | |
| 2020/0175122 A1 * | 6/2020 | Nam ..................... | G06F 30/327 |

OTHER PUBLICATIONS

Xilinx, Inc., "Vivado Design Suite User Guide—Partial Reconfiguration," UG909 (v2018.1), Apr. 27, 2018, 84 pg.

Leds et al., "High-Speed Expansion USB HID Host Spartan-5 XC6SLX45 CSG324C Basic I/O," [online] Atlys™ FPGA Board Reference Manual, Apr. 11, 2016, DOC#: 502-178, @ Digilent, Inc. retrieved from the Internet: <https://reference.digilentinc.com/_media/atlys:atlys:atlys_rm.pdf>, 19 pg.

* cited by examiner

300

| MicroBlaze | Slave Interface | Slave Segment | Offset Address | Range | High Address |
|---|---|---|---|---|---|
| microblaze_0_local_memory/dlmb_bram_if_cntlr | SLMB | Mem | 0x0000_0000 | 8K | 0x0000_1FFF |
| mig_7series_0 | S_AXI | memaddr | 0x8000_0000 | 1G | 0xBFFF_FFFF |
| block_design_container/axi_gpio_0 | S_AXI | Reg | 0x4000_0000 | 64K | 0x4000_FFFF |

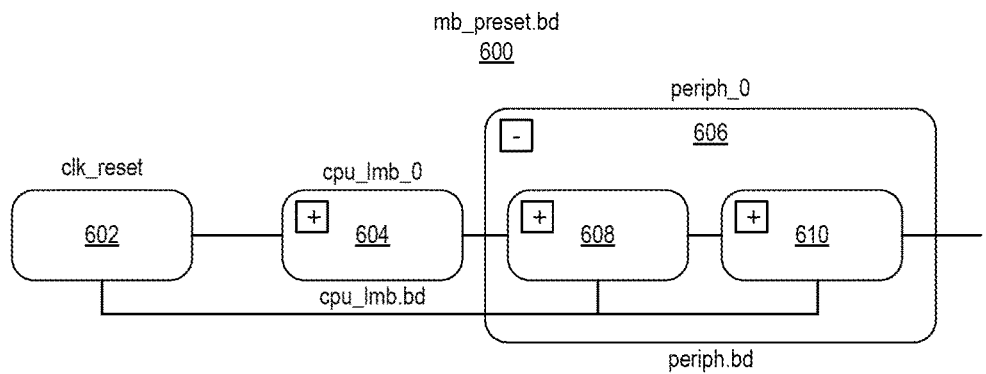

FIG. 6

```
700  Design Sources
       mb_preset_wrapper
         mb_preset_i : mb_preset
           mb_preset
             clk_reset : clk_reset_imp-4EOHOU
             cpu_lmb_0 : cpu_lmb_inst_0
             periph_0 : periph_inst_0
       cpu_lmb
       cpu_lmb_debug
       periph
       periph_console
       periph_debug
       periph_simulation
```

FIG. 7

| CONFIG | |
|---|---|
| ACTIVE_SIM_BD | periph_debug.bd |
| ACTIVE_SYNTH_BD | periph_debug.bd |
| ENABLE DFX | 0 |
| LIST_SIM_BD | periph.bd : periph_debug.bd |
| LIST_SYNTH_BD | periph.bd : periph_debug.bd |
| LOCK_PROPAGATE | 0 |

FIG. 8

BLOCK DESIGN CONTAINERS FOR CIRCUIT DESIGN

TECHNICAL FIELD

This disclosure relates to Electronic Design Automation systems for creating circuit designs for implementation in integrated circuits (ICs). More particularly, this disclosure relates to creating circuit designs for ICs using block design containers.

BACKGROUND

Some Electronic Design Automation (EDA) systems allow users to create circuit designs by instantiating and connecting Intellectual Property (IP) cores within a development environment. The IP cores are represented as graphical blocks within the development environment. Signals that connect the graphical blocks are represented as lines. Often, the complexity of modern circuit designs requires participation of multiple different design teams. Each design team may be responsible for designing a particular IP core of the larger circuit design. Ultimately, these individual IP cores are integrated into one top-level block design.

EDA systems do allow design teams to create a circuit design implementing particular functionality and package that circuit design as an IP core. Packaging a circuit design as an IP core, however, involves a variety of different steps such as setting up the circuit design, generating constraint files, generating the IP core package, generating a new IP definition for the package, and adding the resulting IP core to an IP catalog. Once packaged as an IP core, that circuit design may then be incorporated into a top-level block design and combined with circuit designs packaged as IP cores from other design teams.

Once incorporated into a top-level block design, however, the contents of the IP core are not viewable or editable within the context of that top-level block design. Accordingly, anytime a change to an IP core is required, the underlying circuit design from which the IP core is generated must be edited. The design team must then re-package the changed circuit design as a new IP core using the procedures outlined above. The new IP core may then be incorporated into the top-level block design in place of the old IP core. This requires that a user manually remove the old IP core, incorporate the new IP core, and reconnect the new IP core to the surrounding blocks within the development environment.

An alternative technique for combining the work product of multiple different design teams into a single, top-level block design is for each design team to provide their work product as a sub-design to a person designated as the systems integrator. The systems integrator adds the sub-design files to a single project and manually connects the different sub-designs together therein. The sub-designs are manually connected by writing a hardware description language wrapper for each sub-design so that the sub-designs may be combined into the top-level block design. Again, any changes to a particular sub-design requires manual reintegration of that modified sub-design into the top-level block design.

SUMMARY

In one or more example implementations, a method can include opening, using an Electronic Design Automation (EDA) system, a top-level block design within a development environment generated by the EDA system. The top-level block design specifies a circuit design. The method can include inserting, within the top-level block design using the EDA system, a block design container. The block design container specifies a source block design used as a sub-design within the top-level block design.

In one or more example implementations, a system includes a processor configured to initiate operations. The operations can include opening, within a development environment generated by the system, a top-level block design specifying a circuit design. The operations can include inserting, within the top-level block design, a block design container. The block design container specifies a source block design used as a sub-design within the top-level block design.

In one or more example implementations, a computer program product includes one or more computer readable storage media, and program instructions collectively stored on the one or more computer readable storage media. The program instructions are executable by computer hardware to initiate the various operations described herein.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 6 illustrates another GUI generated by an EDA system displaying a circuit design built using BDCs.

FIG. 7 illustrates a source view of the circuit design of FIG. 6.

FIG. 8 illustrates an example GUI generated by an EDA system and configured to display properties for a BDC.

DETAILED DESCRIPTION

Figure 1:
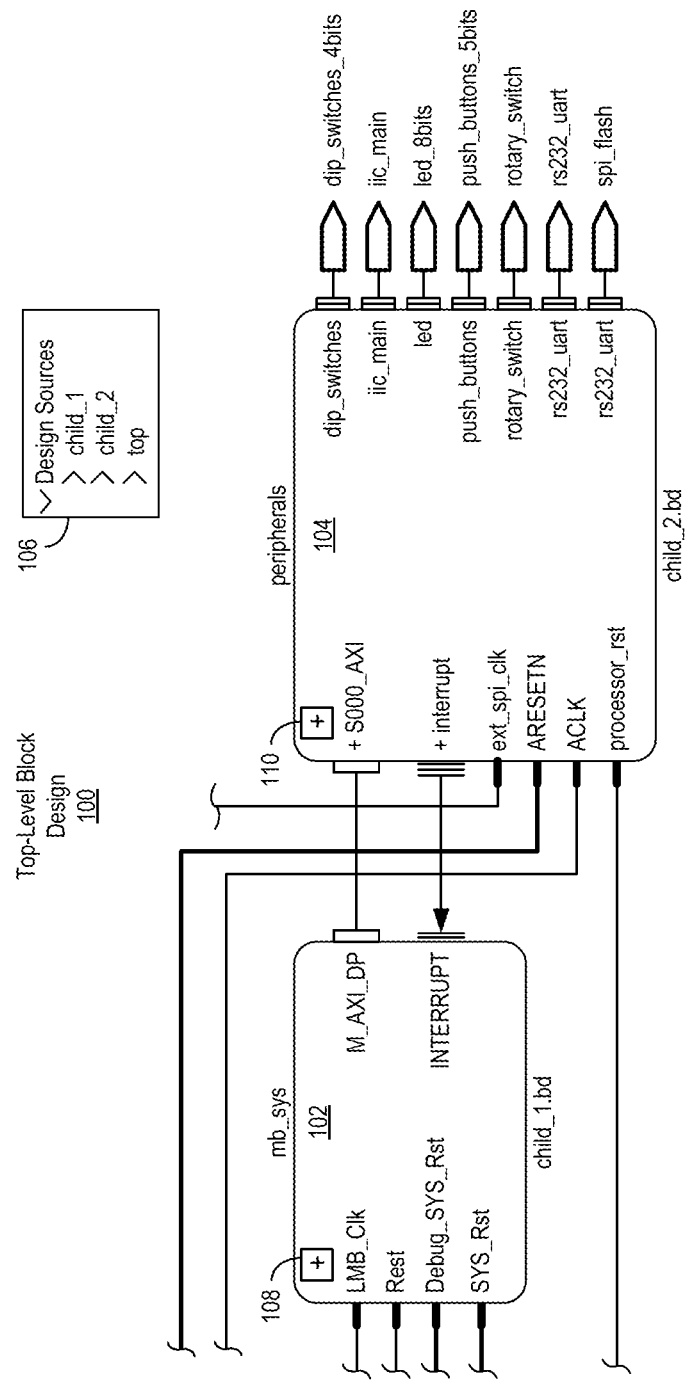
FIG. 1 illustrates an example Graphical User Interface (GUI) generated by an Electronic Design Automation (EDA) system displaying a circuit design built using block design containers (BDCs).

This disclosure relates to Electronic Design Automation (EDA) systems for creating circuit designs for implementation in integrated circuits (ICs). More particularly, this disclosure relates to creating circuit designs for ICs using block design containers. In accordance with the inventive arrangements described herein, circuit designs may be created using a design construct referred to as a block design container (BDC). Using an EDA system, a user is able to create a circuit design. One or more BDCs may be included within the circuit design. Unlike other available design techniques, the BDCs may be customized in the context of the parent circuit design, which may be a top-level block design.

In another aspect, BDCs may be nested. For example, within a given BDC contained within a top-level block design, one or more other BDCs may be included. The ability to create a BDC as a child within a parent such as a block design (e.g., a top-level block design) and/or another BDC facilitates the creation of hierarchical circuit designs with greater ease and flexibility compared to using other available circuit design techniques. Further, the ability to customize a BDC once instantiated as a child within a parent, whether a block design or a BDC, provides increased flexibility not previously available using other circuit design techniques. The use of BDCs can significantly reduce the time required for circuit design creation, facilitate error detection in circuit design earlier in the design cycle, and reduce the number of errors in the circuit design through the use of BDC related techniques such as parameter propagation.

In one or more other example implementations, BDCs may be used in development environments where different users or design teams are tasked with designing a portion of a larger circuit design, where the portion is referred to as a "sub-design." Within this disclosure the term "design team" means one or more users. Each sub-design may be developed as a BDC and later incorporated into a parent block design. In one aspect, the use of BDCs allows each design team to create multiple different versions of the sub-design, referred to as "variants," for the BDC. These different variants may be associated with the BDC. The particular variant to be used for each BDC for a given implementation or purpose may be selected on a per BDC basis.

In one or more other example implementations, BDCs may be used to facilitate Dynamic Function eXchange (DFX). DFX, also known as "partial reconfiguration," refers to a process where a physical region of programmable circuitry of a programmable IC, referred to as a "dynamic region" may be dynamically reconfigured over time to implement different circuit designs therein. Each different circuit design may perform a different function or different version of a function. Thus, the circuitry in the dynamic region may change over time, e.g., be dynamically reconfigured, while circuitry in other regions of the programmable IC, referred to as "static regions" or the "static region," that couple to the dynamic region(s) implement circuitry that does not change over time. Circuitry implemented in the static region may be referred to as static circuitry. Thus, while the circuitry in the dynamic region changes over time, the static circuitry may continue to operate uninterrupted.

In accordance with the inventive arrangements described within this disclosure, the BDCs may be selectively enabled with DFX functionality. A BDC enabled with DFX functionality may have a shared boundary with a static portion of a circuit design. In one aspect, the different variants that may be associated with a given BDC enabled for DFX functionality may be transformed into different reconfigurable modules that may be implemented in the BDC. The BDC itself may be transformed into a reconfigurable partition that may be implemented in a dynamic region of the programmable IC.

FIG. 1 illustrates an example Graphical User Interface (GUI) generated by an EDA system. The circuit design shown in the GUI is built using BDCs. An EDA system may be implemented as a computer system executing suitable software. An example of an EDA system is described in greater detail in connection with FIG. 11. The EDA system is capable of generating and displaying the GUI of FIG. 1 on a display device coupled to the EDA system.

In the example of FIG. 1, the EDA system implements a development environment in which circuit designs may be built and displayed as block designs. As defined within this disclosure, the term "development environment" means a GUI generated by an EDA system in which a user may construct a circuit design as a block design. The GUI may have other visual elements, views, etc., that may be displayed in coordination with a block design or portion of a block design.

A "block design" is a graphical representation of a circuit design or a portion of a circuit design displayed using a GUI. The block design is formed of one or more graphical blocks or "blocks," where each block represents a circuit function. The user may connect the blocks of the block design using lines that represent connections (e.g., wires or signals) between the blocks. The lines define connectivity among the blocks of the block design. Each block of the block design may be associated with one or more parameters defining how that block is to be physically realized in circuitry. Blocks of a block design may represent Intellectual Property (IP) cores and/or BDCs.

As defined herein, the term "Intellectual Property core" or "IP core" means a pre-designed and reusable unit of logic, cell, or chip layout design in the field of electronic circuit design. An IP core may be expressed as a data structure specifying a description of circuitry that performs a particular function. An IP core may be expressed using hardware description language file(s), as a netlist, as a bitstream that programs a programmable IC, or the like. An IP core may be used as a building block within circuit designs adapted for implementation within an IC.

An IP core may include additional resources such as source code, scripts, high-level programming language models, schematics, documentation, constraints, and the like. Examples of different varieties of IP cores include, but are not limited to, digital signal processing (DSP) functions, memories, storage elements, math functions, etc. Some IP cores include an optimally floorplanned layout targeted to a specific family of ICs. IP cores may be parameterizable in that a user may enter a collection of one or more parameters, referred to as a "parameterization," to activate or change certain functionality of an instance of an IP core.

As defined herein, the term "hardware description language" or "HDL" is a computer-language that facilitates the documentation, design, and manufacturing of a digital system, such as an integrated circuit. An HDL is expressed in human readable form and combines program verification techniques with expert system design methodologies. Using an HDL, for example, a user can design and specify an electronic circuit, describe the operation of the circuit, and create tests to verify operation of the circuit. An HDL includes standard, text-based expressions of the spatial and temporal structure and behavior of the electronic system being modeled. HDL syntax and semantics include explicit notations for expressing concurrency. In contrast to most high-level programming languages, an HDL also includes an explicit notion of time, e.g., clocks and/or clock signals, which is a primary attribute of a digital system. For example, an HDL design may describe the behavior of a circuit design as data transfers occur between registers each clock cycle. Examples of HDLs may include, but are not limited to, Verilog and VHDL. HDLs are sometimes referred to as register transfer level (RTL) descriptions of circuit designs and/or digital systems. Both Verilog and VHDL support the ability to specify attributes on modules in their native syntax.

As defined within this disclosure, the term "block design container" or "BDC" means a pre-designed and reusable unit of circuit design hierarchy including one or more blocks of a block design in the field of electronic circuit design. A BDC may be expressed as a data structure specifying such hierarchy. Unlike IP cores, a BDC, when instantiated as a child within a parent block design or within a parent BDC, may be expanded to reveal the constituent blocks and connectivity of the constituent blocks of the child BDC within the development environment of the parent. Further, unlike IP cores or other blocks of a block design, the source or sources of a BDC may be loosely coupled to the BDC itself. This allows a single BDC to be associated with one or more different alternative sources, also referred to as variants. A source, or variant, may specify a block design or a simulation model. A BDC may include a list of one or more sources that are to be used for purposes of synthesis and/or a list of one or more source files that may be used for purposes of simulation.

As an illustrative and non-limiting example, a source that specifies a block design specifies one or more blocks (IP cores and/or child BDCs), connectivity of the blocks, and/or parameters for the blocks. A source for simulation specifies a simulation model to be used for a BDC for purposes of simulation. For purposes of discussion, a source specifying a block design may be referred to herein as a "source block design" or a "synthesis source." A source specifying a simulation model may be referred to herein as a "simulation source."

The circuit design displayed by the GUI of FIG. 1 is constructed as a top-level block design 100 (e.g., a block design). In the example of FIG. 1, two child BDCs have been instantiated in top-level block design 100 as child BDC 102 and child BDC 104. A BDC may be a child as in the case of FIG. 1 where the BDC (e.g., either 102 and/or 104) is included in a block design, also referred to as the parent. As discussed, a BDC may also be included as a child within another BDC, where the BDC that includes the child BDC is referred to as the parent.

Child BDCs may be instantiated within a block design using any of a variety of different programmatic mechanisms. The ability to instantiate one or more BDCs into a block design allows users to design one or more BDCs within their own project and/or to import those BDCs into another project. These BDCs, which may be developed by different teams, may be brought together within a common or single block design such as top-level block design 100. A BDC may be instantiated in top-level block design 100 without performing any packaging of the sub-designs into IP cores. Though not shown in the example of FIG. 1, top-level block design 100 may include blocks other than BDCs. For example, top-level block design 100 may include one or more IP cores therein that may be coupled to one another and/or to any BDCs contained therein. While not specifically illustrated in the example of FIG. 1, a block representing a BDC may be visually distinguished from a non-BDC block such as an IP core.

In one aspect, referred to as a "top-down approach," a BDC may be instantiated as a child BDC in a parent block design by taking an existing top-level block design that is completely built and validated, selecting the contents (e.g., one or more blocks) of the top-level block design to be included in the BDC (e.g., by using a pointing device to select the blocks of the top-level block design or using a "select-all" command), and choosing a "create hierarchy" command within the EDA system. With the hierarchy created to include the selected blocks from the top-level block design, the user may then select a "create new block design container" command. In response to the "create new block design container" command, the EDA system creates a new block design that specifies the selected hierarchy that was created. The EDA system further generates a new BDC, e.g., a new file, where the previously created hierarchy is saved as the default source block design for the newly created BDC. Further, the hierarchy in the top-level block design that was initially selected to create the new BDC may be replaced with the newly created BDC pointing to the default source block design.

In another aspect, referred to as a "bottom-up approach," a user may add one or more different source block designs to a project opened within the development environment. The source block designs may or may not be owned by the project. For example, the user may drag-and-drop a source block design from a source view 106 into the development environment. The source view 106 lists one or more source block designs that may be instantiated into top-level block design 100. In the example of FIG. 1, the user has used the bottom-up approach to insert both of BDCs 102, 104 into the development environment for top-level block design 100. That is, the user may drag "child_1" into top-level block design 100 from source view 106, which instantiates BDC 102 therein having "child_1.bd" as the source block design. The user may also drag "child_2" into top-level block design 100 from source view 106, which instantiates BDC 104 therein having "child_2.bd" as the source block design.

BDCs allow users to instantiate one or more BDCs inside of another block design without going through any of the packaging operations and/or steps that were previously necessary to generate an IP core. One may create BDCs as if you are creating a regular block design. Further, one need not know or indicate, a priori, whether the BDC being created will be included within another block design or BDC.

Both of the top-down and bottom-up approaches support modularity where users are able to create different BDCs in isolation, bring those BDCs together, and connect the BDCs in a common top-level block design. Creation of BDCs supports reusability where once a user creates a BDC, the BDC may be re-used in any other context (e.g., included in any other parent, whether nested within a different BDC or included as one or more instances within a top-level block design). In this regard, BDCs facilitate team-based design approaches where each team may implement a part of a larger circuit design as a BDC and later instantiate that BDC in the top-level block design.

By loosely coupling the source block design and the BDC, the BDC may be associated with one or more source block designs also referred to as "variants." In one aspect, each BDC may include a list of one or more variants. Referring to the example of FIG. 1, BDC 102 represents a circuit design for a processor system. For purposes of illustration, the processor system is a MicroBlaze™ processor available from Xilinx, Inc. of San Jose, California. It should be appreciated that MicroBlaze™ is used for purposes of illustration and that other processors, processor systems, or circuits may be represented as a BDC. In any case, FIG. 1 illustrates that while the name of BDC 102 is "mb_sys" corresponding to a processor system, the source block design for BDC 102 is specified by the "child_1.bd" file. Similarly, while the name of BDC 104 is "peripherals" corresponding to one or more peripheral circuits and/or peripheral interfaces, the source block design for BDC 104 is specified by the "child_2.bd" file.

In the example of FIG. 1, each child BDC may include a control that controls expansion of the respective BDC within top-level block design 100. A user selection of control 108 in BDC 102, for example, expands BDC 102 within the view of top-level block design 100 to reveal the contents of BDC 102. Similarly, a user selection of control 110 in BDC 104, for example, expands BDC 104 within the view of top-level block design 100 to reveal the contents of BDC 104. Once a BDC is expanded in the context of top-level block design 100, the user may view parameters of the underlying or constituent blocks of the expanded BDC. That is, the user may view the contents of an expanded BDC while viewing that expanded BDC in same view used to display the parent block design. In cases where a BDC is nested within another BDC, the child BDC may be similarly expanded within the view of the parent BDC.

Figure 2:
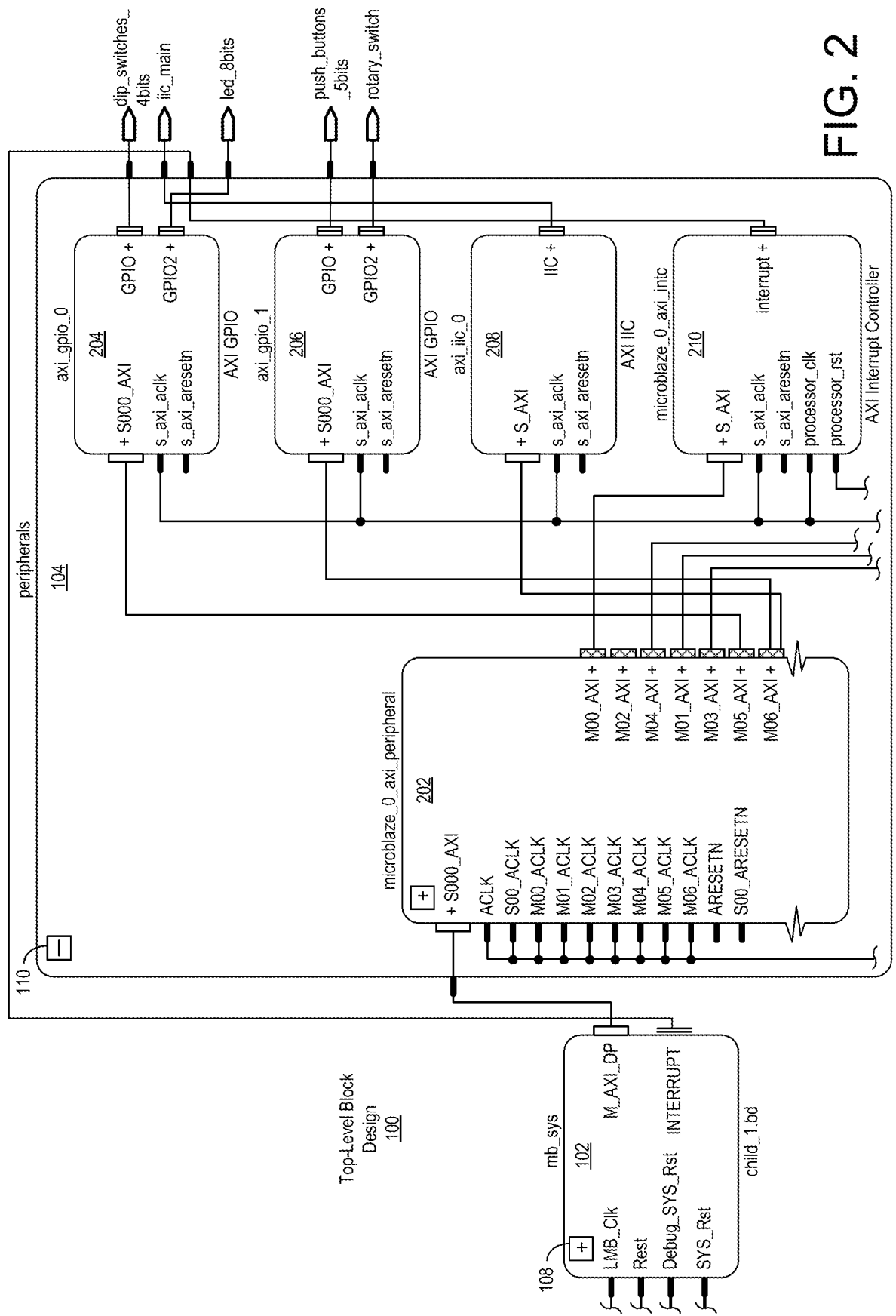
FIG. 2 illustrates an example of BDC expansion.

FIG. 2 illustrates an example of BDC expansion. FIG. 2 illustrates an example where the user has selected control 110 to expand BDC 104. BDC 104 is expanded in the same view showing top-level block design 100. As expanded, BDC 104 includes blocks 202, 204, 206, 208, and 210 corresponding to a MicroBlaze Peripheral, two AXI GPIOs (an AXI General Purpose Input/Output), an AXI IIC bus interface (e.g., an Inter-Integrated Circuit or I2C bus interface), and an AXI Interrupt Controller, respectively. The term "AXI" refers to the Advanced Microcontroller Bus Architecture (AMBA) eXtensible Interface (AXI) bus. The connections at the borders of BDC 104 are shown as well as how those connections connect to the constituent blocks of BDC 104 internally.

In the expansion view shown in FIG. 2, users may not edit parameters of the constituent blocks of expanded BDC 104 since expanded BDC 104 is linked to the original source block design. In this case, expanded BDC 104 is linked to the source block design "child_2.bd." In one aspect, having expanded a BDC, a user is able to edit internal addresses of the constituent blocks of the expanded BDC in the context of the parent block design. That is, the user is able to edit the internal addresses of the constituent blocks of expanded BDC 104, e.g., blocks 202, 204, 206, 208, and/or 210, as instantiated within top-level block design 100. A user may double click any of the constituent blocks 202-210 of expanded BDC 104 to view the configuration settings for that constituent block. Addresses of the constituent blocks may be changed.

Figures 3, 4:
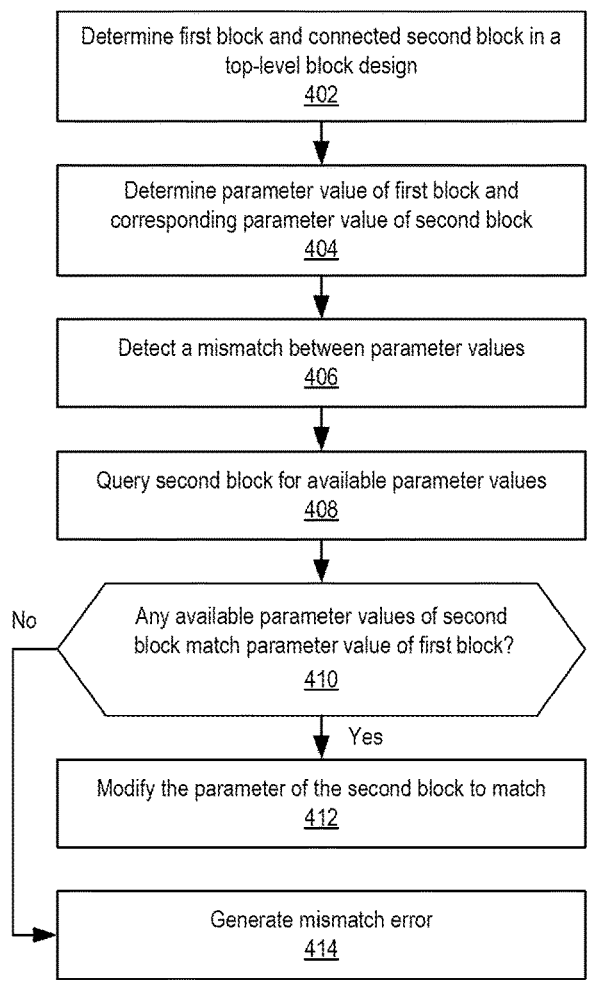
FIG. 3 illustrates another example GUI that may be generated by an EDA system.
FIG. 4 illustrates an example method of unidirectional parameter propagation involving one or more BDCs.

FIG. 3 illustrates another example GUI that may be generated by the EDA system. In the example of FIG. 3, the GUI shows a view 300 that may be used by a user to edit the internal addresses of constituent blocks of an expanded BDC. For example, in response to the user selecting, e.g., double-clicking, on block 204 of expanded BDC 104 of FIG. 2 (e.g., instance 0 of the AXI-GPIO named "axi_gpio_0"), the EDA system displays view 300 of FIG. 3. View 300 allows the user to edit addressing of the selected constituent block of the BDC. As such, the user may modify the address (e.g., offset address) of one or more or all of the constituent blocks of expanded BDC 104 using view 300 or one similar thereto. This allows a user to directly modify the addressing of the underlying blocks of a BDC within the context, e.g., development environment, of the parent block design.

In one or more other example implementations, BDCs support parameter propagation. Parameter propagation, or "propagation," refers to a process whereby the EDA system is capable of setting a value of a parameter of a BDC based on the parameter value of circuitry that connects to the border of the BDC. In general, for a given circuit design, the user may select a validation command in the EDA system. In response to the validation command, the EDA system is capable of checking that the various blocks in the block design are compatible with one another as connected in the development environment. As part of the validation process, the EDA system may perform propagation.

Parameter propagation may be performed unidirectionally or bidirectionally. The type of propagation performed, e.g., unidirectional or bidirectional, may depend on the type of parameter being propagated. In the unidirectional case, for example, a circuit block that is considered a master in the top-level block design may propagate one or more parameter values to a slave circuit block that is connected to the master circuit block.

In an example implementation, BDCs include a boundary lock parameter. The boundary lock parameter of a BDC, when set to "lock," effectively freezes the boundary of the BDC and prevents parameter values at the boundary of the BDC or within the BDC from being changed by virtue of parameter propagation from outside of the BDC. That is, values from outside of the BDC do not change parameter values of the BDC boundary or parameter values within the BDC. With the boundary lock parameter of a BDC set to lock, the BDC still may propagate parameters outside of the block into the top-level block design, e.g., to the blocks connected to the BDC. The boundary lock parameter, when set to lock, effectively hardens the BDC so that the parameter values of the BDC may not be changed by blocks external to the BDC. Further, the boundary lock parameter, when set to lock, effectively implements unidirectional parameter propagation (e.g., from the BDC outward).

FIG. 4 illustrates an example method 400 of unidirectional parameter propagation involving one or more BDCs of a block design. Method 400 may be performed by an EDA system to propagate parameters among blocks of a top-level block design.

In block 402, the EDA system determines a first block and a second block connected to the first block within a top-level block design. In one aspect, the first block may be a master circuit block while the second block is a slave circuit block. The first block may be an IP core or a BDC. The second block may be a BDC. In block 404, the EDA system determines a parameter value of the first block and a corresponding parameter value of the second block.

For purposes of illustration, consider an example where the first block has an interface with a bit width of 32 bits, e.g., the first block is configured to generate 32 bits of data. The second block, which has a corresponding interface connected to the interface of the first block, is configurable so that the interface of the second block has a bit width of 32 bits or 64 bits. In the example, the interface of the second block is initially configured to have an interface of 64 bits. The EDA system is capable of detecting these differences during validation.

In block 406, the EDA system detects a mismatch between the parameter values of the first block and the connected second block. That is, the EDA system determines that the two interfaces of the respective blocks have different bit widths. In block 408, the EDA system determines the available parameter values that the second bock may take on. In response to determining a mismatch, the EDA system queries the second block to determine the particular values that the parameter of the second block may take on (e.g., be assigned). In this example, the EDA system determines that despite the second block being configured to have an interface that is 32 bits in width, the interface of the second block is configurable to have a width of 32 bits or a width of 64 bits.

In block 410, the EDA system determines whether any of the available parameter values of the second block match the parameter value of the first block. In this example, the second block does have an available parameter value of 32 bits. Accordingly, in response to determining that the second block has a parameter value that matches the parameter value of the first block, method 400 continues to block 412. In block 412, the EDA system modifies the parameter value of the second block to match the parameter value of the first block. In this example, the EDA system modifies the parameter or the second block, or sets the parameter value of the second block, to be 32 bits.

Alternatively, in response to determining that the second block does not have a parameter value that matches the parameter value of the first block, method 400 continues to block 414 where the EDA system generates a mismatch error indicating that one of the blocks may not be configured correctly to communicate with the other.

In the example of FIG. 4, where the second block is a BDC, the boundary lock parameter would be set to unlock so that the 32-bit width may propagate to the BDC to change the width of the interface therein. Were the boundary lock parameter set to lock, the EDA system would be unable to propagate the 32-bit width to the interface therein and may generate a mismatch error as described. If the first block were a BDC, the boundary lock parameter may be set to either lock or unlock.

Figure 5:
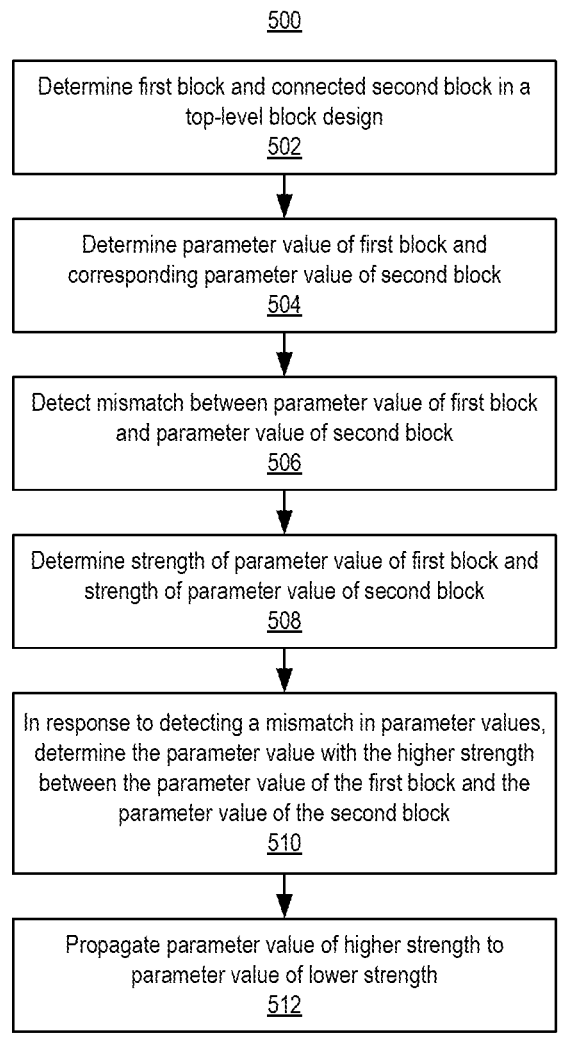
FIG. 5 illustrates an example method of bidirectional parameter propagation involving one or more BDCs.

FIG. 5 illustrates an example method 500 of bidirectional parameter propagation involving one or more BDCs of a block design. Method 500 may be performed by an EDA system to propagate parameters from one block to another block. The example of FIG. 5 uses a measure of "strength" for different parameters to determine which way a given parameter value should be propagated. As an illustrative and non-limiting example, a parameter may be assigned a default value, a constant value, or a user-specified value. A constant value means is a type of value that may not be changed. A constant value generally has a high strength as the parameter may not be assigned a different value. A default value and a user value both have lower strengths than constant values.

In block 502, the EDA system determines a first block and a second block connected to the first block within a top-level block design. In one aspect, the first block may be a master circuit block while the second block is a slave circuit block. The first block may be an IP core or a BDC. The second block may be a BDC. In block 504, the EDA system determines a parameter value of the first block and a corresponding parameter value of the second block.

In block 506, the EDA system detects a mismatch in the parameter values between the first block and the connected second block. In block 508, the EDA system determines a strength of the parameter value of the first block and a strength of the parameter value of the second block.

In block 510, the EDA system, in response to determining a mismatch in the parameter values, determines the parameter value with the higher strength between the parameter value of the first block and the parameter value of the second block. In block 512, the EDA system propagates the parameter value of the higher strength to the parameter value of the lower strength. That is, the EDA system writes or assigns the value of the parameter with the highest strength, regardless of whether the circuit block is the first or second, to the corresponding parameter having the lower strength parameter in the other block. Accordingly, the EDA system overwrites the parameter value with the lower strength with the parameter value of the higher strength regardless of whether the parameter value of the first or second circuit block is being overwritten. This technique is unidirectional as the strengths determine the direction in which parameter values propagate. It should be appreciated that the boundary lock parameters of any BDCs involved will need to be set accordingly to allow for parameter propagation in the direction indicated by the strengths.

In one or more aspects, the EDA system may perform an additional check to ensure that the particular block having the parameter value being overwritten is capable of accepting that parameter value. If not, the EDA system is capable of generating a mismatch error. For example, the EDA system may perform a check similar to that described in connection with blocks 408 and 410 of FIG. 4, albeit with reference to whichever circuit block has the lower strength parameter value to be overwritten. In the example of FIG. 5, any block (e.g., BDC) having a constant value will have a higher strength parameter value that is effectively propagated out into the top-level design.

It should be appreciated that in cases where a value is propagated to a parameter of a BDC, whether in the context of FIG. 4 or FIG. 5, that value may further be propagated to the constituent blocks within the BDC. For example, in the case where width of the interface is adjusted, the bit width of any underlying circuit blocks (e.g., IP cores) included in the BDC may be updated or modified with the propagated parameter value. For example, the EDA system is capable of propagating a parameter value to a boundary of a BDC. In an example implementation, the BDC and the IP cores included therein, may have a propagate function built in that may be executed to evaluate the interface parameters propagated to the BDC and set any internal IP core parameters based on what has been propagated to the boundary of the BDC. Such functions may also check the boundary lock parameters of the BDC to proceed with parameter propagation in accordance with the value of the boundary lock parameters.

In another aspect, a user or design team may make a change to a BDC. The BDC, for example, may be under continued development. That BDC also may be included as a child within a top-level block design. In an example implementation, the change to the BDC may be automatically indicated within the top-level block design. For example, once the change to the child BDC is made final (e.g., saved and/or published), a notification may be generated within the top-level block design.

As an illustrative example, if a change to the source child_1.bd is made, which is the source block design of BDC 102, the EDA system detects the change. Knowing that BDC 102 is instantiated within top-level block design 100, the EDA system, in response to the detected change, is capable of generating a notification of the change to the source of BDC 102 and displaying a notification within the development environment in which top-level block design 100 is displayed or opened. In this example, the entity changing the BDC may be the same as or different from the entity working in the top-level block design in which the BDC is included and for which the notification is generated. The notification may be presented as a visual indication or GUI element. An example GUI element may be a banner with text asking whether the user working on top-level block design 100 would like to accept the change to the BDC within top-level block design 100. The notification may indicate that an update or change to the underlying source block design of BDC 102 is available. In response to the user selecting or clicking on the notification, the EDA system refreshes each of the BDCs 102 and 104 in top-level block design 100 to use or point to, the updated source block designs.

In one example implementation, the notification may be specific to the particular BDC(s) that are affected. For example, BDC 102 may be displayed with different visual characteristics such as a flag or different color to indicate the availability of an updated source block design for BDC 102 (e.g., only for BDC 102). In response to the user selecting or clicking on the notification for BDC 102, the EDA system is capable of refreshing BDC 102 in top-level block design 100 to use or point to, the updated source block design. This allows the user to update only those BDC(s) that the user desires as opposed to all BDCs for which an updated source block design is available.

In another example implementation, BDCs are capable of providing enhanced designer assistance support. A BDC is implemented so that the source block design(s) of the BDC are part of the parent top-level block design as if the source block design(s) were owned by the parent top-level block design. This allows users to leverage features such as circuit board automation and/or connection automation. Circuit board automation, as implemented by the EDA system, is capable of automatically connecting a child BDC to one or more circuit board interfaces in the parent top-level block design. Connection automation, as implemented by the EDA system, for example, is capable of automatically connecting memory-mapped interfaces in child BDCs to memory-mapped or streaming interfaces in the parent top-level block design, with full knowledge of the child BDCs configuration and topology.

As an illustrative and non-limiting example of enhanced design assistance, a user may instantiate a BDC of a processor capable of executing program code within top-level block design 100. In response to the user instantiating the processor BDC, the EDA system is capable of automatically instantiating a bus block and a memory block for the processor BDC (e.g., with the approval of the user) and make the connections between the blocks. The EDA system automatically connects the processor BDC to the memory block and to the bus block. The EDA system may query the user as to whether the user wishes to use the enhanced design assistance, how much memory may be needed, etc., prior to performing any automated actions. In another example, the EDA system is capable of automatically instantiating other peripherals for the processor BDC such as a General-Purpose Input/Output (GPIO) block for the processor BDC and connecting the GPIO block to the processor BDC in top-level block design 100.

An example of circuit board automation may include a BDC, having been instantiated in a top-level block design, including one or more IP cores included in the BDC that are to connect to circuit board interfaces. In one aspect, upon creation of that BDC, the EDA system is capable of preserving the information (e.g., connectivity of the BDC container boundary) so that the same or similar options are available when the BDC is instantiated in a different context (e.g., instantiated in a different block design or in a parent BDC). Upon instantiation of the BDC in the different context, the EDA system detects the saved boundary information for the BDC and is capable of automatically implementing the connection and/or circuit board automation. That is, the EDA system is capable of connecting the interfaces of the IP cores contained in the BDC to the available circuit board interfaces.

In another example implementation, a given child BDC may be unlinked from the source block design of the child BDC. As discussed, the default behavior of a BDC loosely couples (e.g., links) the child BDC to the source block design. The linking allows the EDA system to synchronize changes in the source block design of a given child BDC to the top-level block design in which the child BDC is instantiated as previously described. In some cases, this behavior may not be desirable.

Accordingly, in one or more example implementations, a user may specify the behavior to implement when editing the source block design of a child BDC through the top-level block design in which the child BDC is instantiated. For example, a user may select an option to edit a child BDC as instantiated within a parent top-level block design. In response, the EDA system queries the user (e.g., via a GUI) whether the user wishes to edit the child BDC or directly edit the source block design of the child BDC.

Choosing to edit the child BDC severs or deletes the link between the source block design and the child BDC. Once the link between a child BDC and the source block design is severed, the user may continue to make changes to the source block design. Changes to the source block design will only affect the particular instance of the child BDC the user selected for editing, but not affect any other instances of the child BDC within the top-level block design. That is, once a BDC is unlinked from its source block design, a user may continue to make changes to that instance of the BDC (and/or the source block design thereof) without making any changes to other instantiations of that BDC in the top-level block design.

Choosing to directly edit the source block design of the child BDC preserves the link between the child BDC and the source block design and synchronizes any changes to the source block design to all the child BDCs as instantiated in the top-level block design.

Either editing option may be exercised by the user through the top-level block design. For example, the user may choose to edit BDC 102 of FIG. 1 (e.g., the child BDC) as BDC 102 is instantiated in top-level block design 100 or choose to directly edit the source block design of BDC 102 as instantiated in top-level block design 100.

As discussed, BDCs may be linked with one or more different sources. In accordance with one or more examples, a BDC may be implemented to include a list of sources that may be used for the BDC. A user may choose a particular source to be used for the BDC at any given time. The particular source selected for a BDC may be referred to herein as the "active" source or active variant.

This feature allows a particular design team to create multiple different versions of a design as different source block designs, where each is linked to the BDC being developed through inclusion on the list for the BDC. In different contexts, e.g., as the BDC is distributed to other groups and/or design teams, each different recipient may use the BDC and the particular source that suits the needs of that recipient. As such, a BDC may hold multiple versions of a sub-design with ability of the recipient or user of the BDC to swap one sub-design for another and integrate a selected version, the active variant, into a respective flow automatically.

Referring to the example of FIG. 1, each of the BDCs 102 and 104 may include multiple sub-designs. If the top-level block design 100 is shared across different development teams in an organization, each different development team (which may be located in different geographical locations), may have restrictions on the types of features that may be used in each BDC. These restrictions may relate to features such as security keys, algorithms, network settings, and the like. In allowing multiple sub-designs to be associated with each BDC as different sources, each design team may choose their own sub-design to be used by the BDCs in the top-level block design 100 without having to modify anything in top-level block design 100. That is, each design team may simply choose the active variant to be used for each of BDCs 102, 104 within top-level block design 100. This allows the contents of a BDC to be effectively swapped out using these different available variants for the BDC.

The source used by each design team may be shared with other design teams and/or locations without the need to spend significant time integrating new versions into the top-level block design 100. Each design team is able to see and use the different sources for each BDC and/or develop their own source and associate the new source with the BDC(s) to be shared with other design teams. In effect, selecting a different active variant for a given BDC uses the different source for that BDC. Each user may choose the particular source to be used as the active variant. In one aspect, each newly developed sub-design, when associated with a BDC and specified on the list contained in the BDC as a source, may be available through a shared library that is available to the other development teams. As such, development teams may collaborate and share different sub-designs for BDCs effectively without going through integration issues typically associated with IP cores.

FIG. 6 illustrates another GUI generated by an EDA system displaying a circuit design built using BDCs. In the example of FIG. 6, the top-level design 600 called "mb_preset.bd" includes a block 602, a BDC 604, and a BDC 606. BDC 606, having been expanded as described herein, includes constituent circuit blocks 608 and 610. Circuit blocks 608 and 610 may be implemented as IP cores or as BDCs. In the example of FIG. 6, for each BDC that is referenced in a top-level block design, the EDA system creates a separate instance copy of the source and assigns that instance copy to the list for the BDC included in the top-level block design. For example, the source "cpu_lmb.bd" is referenced by BDC 604 in top-level design "mp_preset.bd." The EDA system automatically creates a copy of "cpu_lmb.bd" named "cpu_lmb_inst_0.bd" and attaches the copy to BDC 604 as the active variant in the list of sources for BDC 604. Similarly, the source "periph.bd" is referenced by BDC 606 (e.g., periph_0). Accordingly, the EDA system creates a copy of "periph.bd" named "periph_inst_0.bd" and attaches the copy "periph_inst_0.bd" to list of BDC 606 as the active variant.

The examples described thus far have used BDCs linked with a source block design. In other example implementations, a BDC may be linked with a plurality of different source types suited for simulation and/or synthesis. In accordance with one or more examples, a BDC may be implemented to include one or more lists of sources that may be used for a synthesis flow and/or a simulation flow. For example, the BDC may include a list specifying one or more different sources for each different flow. A user may choose a particular source to be used for the BDC for either one or both flows at any given time. The particular source selected for a given flow may be referred to herein as the "active" source or active variant for the flow.

FIG. 7 illustrates a source view 700 of the circuit design of FIG. 6. Source view 700 may be generated and displayed by the EDA system to show the available variants for the BDCs included in the top-level design 600. In the example of FIG. 7, BDC 604 includes variants "cpu_lmb" and "cpu_lmb_debug." In this example, "cpu_lmb" is the active variant for BDC 604. BDC 606 includes the variants "periph," "periph_console," "periph_debug," and "periph_simulation." The active variant is "periph."

In one aspect, any sub-design to be used as a variant of a BDC must be validated and added to an open project in the EDA system before adding that sub-design as a variant to the relevant BDC. Once validated and added to the project, the sub-design may be added to the list of variants, whether to the list of variants for synthesis or for simulation or for both. Once added to a list, a user may swap one variant as the active variant in place of another variant for the BDC.

Properties of the BDC may be updated based on which of the variants is selected for the BDC as the active variant to be used in further design steps for the relevant flow. In one aspect, anytime a variant of a BDC is switched, the EDA system creates a separate instance copy of the sub-design if one does not already exist.

In situations where the newly selected active variant has a different boundary than the prior active variant, the EDA system is capable of performing automation services such as, for example, connection automation, assignment of addresses, and parameter propagation on the newly specified active variant in the context of the top-level design. Two variants having the same boundary means that the two variants have the same interfaces, signals, and values for parameters at the boundaries of the respective sub-designs. The boundary of a BDC or a block design refers to, and defines, a set of one or more pins and interfaces. The interfaces include port maps. Each port map has a width. Further, pins and interfaces each may have one or more parameters. The parameters may be HDL parameters and/or platform parameters.

FIG. 8 illustrates an example GUI generated by the EDA system. The example GUI of FIG. 8 is configured to display properties for a BDC. For purposes of illustration, the GUI of FIG. 8 displays properties for BDC 606. Using the example GUI of FIG. 8, a user may edit any of the parameters shown. For example, the user may change the active variant that is used for synthesis (ACTIVE_SYNTH_BD) and/or for simulation (ACTIVE_SIM_BD). Though the same variant is used as the active variant for both synthesis and simulation flows, it should be appreciated that a different variant may be used for synthesis than is used for simulation so long as both variants have the same boundary.

For purposes of illustration, consider an example use case where a company is working on a large circuit design. Portions of this circuit design may vary based on the particular geographic location where the circuit design will be used. For example, Europe may have different requirements than other parts of the world such as North America, thereby necessitating different sub-designs be used in the circuit design depending on where the circuit design will be sold and/or used. In such an example, the portion of the top-level block design (e.g., for the referenced circuit design) that varies with geographic location in which the circuit design is to be used may be implemented as a BDC.

Each different sub-design of the BDC may correspond to a different geographic location and may be implemented as a variant of the BDC.

Using different active variants for synthesis than for simulation supports greater flexibility. Consider the case where a processor BDC is used within a top-level block design. Some simulation models of particular processors may execute significantly faster than simulation models of other processors. The ability to specify different active variants for use in synthesis than for simulation allows a source block design for a first processor to be designated as the active variant for the processor BDC for purposes of synthesis, while the simulation source for a second and different processor may be specified as the active variant for the BDC for purposes of simulation. The two processors may be functionally equivalent. In this example, a particular processor may be synthesized as intended for the circuit design, while a different processor having a faster simulation model than the processor being synthesized may be used for purposes of simulation. This type of operation is supported so long as the boundaries of the different variants are the same. This type of arrangement, where the variant used for synthesis differs from the variant used for simulation, allows the EDA system to use a faster and more efficient simulation model for simulation. The simulation model may be functionally equivalent to the slower simulation model available for the source block design used for synthesis.

For example, if a BDC is using one variant for synthesis and another variant for simulation, the boundary of the two variants must match to produce correct hardware description language for the top-level block design. The EDA system considers an active variant of a BDC to have the correct and final version of boundary elements. In this regard, the EDA system is capable of comparing the boundary of the active variant for synthesis with the active variant for simulation for any given BDC. The EDA system is capable of generating a notification via the GUI indicating that a mismatch is detected between the boundaries of the two variants. The check may be performed during a validation operation as performed by the EDA system. For example, the EDA system may compare the boundaries of variants for a given BDC (e.g., port maps, port widths, and/or other design elements) to detect a mismatch between boundaries of the variants. The mismatch may be detected between synthesis variants, between simulation variants, and across (e.g., between) synthesis and simulation variants.

Any time a synthesis flow is to be performed on the top-level block design, the active variant from the synthesis list of each respective BDC is passed into, or used by, the EDA system to perform the synthesis flow. Those variants that are not the active variant for synthesis for the respective BDCs of the top-level block design are not used, e.g., not synthesized as part of the top-level block design. The EDA system, in performing synthesis, uses only the active variants specified on the synthesis lists of the BDCs to generate the hardware description language netlist for the top-level block design.

Similarly, any time a simulation flow is to be performed on the top-level design, the active variant from the simulation list of each respective BDC is passed into, or used by, the EDA system to perform the simulation flow. Those variants that are not the active variant for simulation for the respective BDCs of the top-level block design are not used for purposes of simulation. The EDA system uses only the active variants specified on the simulation lists of the BDCs to simulate the top-level block design.

In one or more example implementations, deletion of a BDC from a top-level block design within the EDA system's development environment causes the EDA system to mark each variant of the BDC for deletion. Removing a variant from the synthesis list or the simulation list of a BDC causes the EDA system to mark the status of the variant as deleted. With a deleted status, the EDA system does not make the variant available for selection by a user as an active variant for the BDC. Though marked for deletion, it should be appreciated that instance copies of sub-design files may be preserved for purposes of undo and redo operations in the EDA system. Any unused sub-designs may be deleted upon closing of the top-level block design in the development environment.

In another example implementation, a user may create a new variant from an existing sub-design that has the same boundary as the active variant. For example, in response to a user input requesting the creation of a new variant based on the boundary of the active variant, the EDA system is capable of generating a blank variant (e.g., a blank source block design). The EDA system may then automatically copy the boundary elements of the active variant into the blank variant. The EDA system, for example, may copy parameters of the boundary such as the boundary protocol, input/output interfaces, ports, board interface configurations of the ports, port maps, port widths, any platform interfaces, hardware description language attributes, and/or block design attributes into the blank variant. This capability prevents boundary mismatches from occurring in cases where new variants are created for a BDC. The user may concentrate efforts on the functional algorithm being developed as opposed to re-creating a boundary for the newly created variant that matches the active variant.

In the example implementations described herein, the active variant, whether for simulation or synthesis, is manually selected by the user. In one or more other example implementations, variants may be tagged with one or more additional configuration parameters that allow the EDA system to automatically select the active variant based on the context of the top-level block design.

In the example implementations described herein, the files for sub-designs are added to a given project for a top-level block design before the sources may be added to a given BDC as variants. In one or more other example implementations, sources may be shared across projects and network locations.

In one or more example implementations, an executable and linkable file (ELF) may be associated with the active variant of a processor BDC (e.g., a BDC defining a processor capable of executing program code). The ELF association is available in the top-level block design. In one or more other example implementations, the ELF may be associated with any other variant of the processor BDC. For example, in response to a currently inactive variant being designated as the active variant for a processor BDC in a top-level block design, the EDA system may automatically switch the association of the ELF from the prior active variant to the newly selected active variant for the processor BDC within the top-level block design.

In one or more example implementations, BDCs may also be selectively enabled with DFX functionality. Referring to the example of FIG. 8, the configuration parameters of a BDC may include an "enable DFX" parameter. When set to a value of 1, the DFX functionality of the BDC is enabled. In that case, the BDC is considered to have DFX functionality by the EDA system. With DFX functionality enabled, the variants associated with the BDC, for purposes of synthesis, each may be converted into a different reconfigurable module for purposes of partially reconfiguring a target IC in which the top-level block design is to be implemented. Otherwise, without DFX functionality being enabled, only the active variant for each BDC is synthesized.

In an example implementation, the dynamic region(s) of a circuit design may be implemented using one or more BDCs. While the static region of the circuit design continues to run, different circuit designs may be swapped into and out of the dynamic region(s) over time. In using BDCs for the dynamic region(s), these different circuit designs may be realized as variants of the BDC. In order to achieve DFX functionality, the boundary between the static region and the dynamic region must be fixed.

Figure 9:
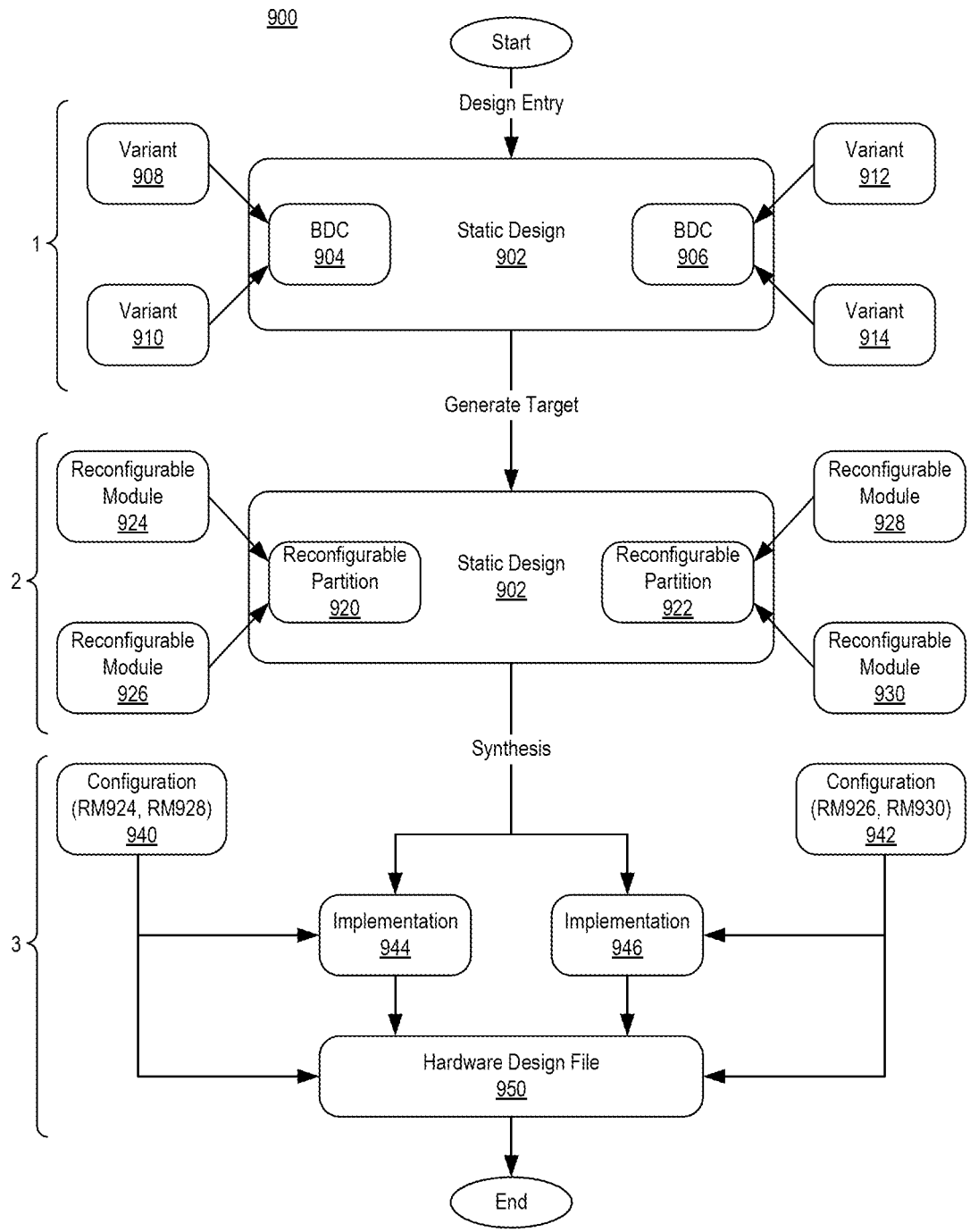
FIG. 9 illustrates an example design flow for Dynamic Function eXchange (DFX) functionality.

FIG. 9 illustrates an example design flow 900 for DFX functionality. The example design flow 900 may be implemented by an EDA system as described herein. In one aspect, the design flow illustrated may be performed automatically in response to a user request. That is, the various operations described in connection with FIG. 9 relating to the different phases may be performed automatically in response to a user request to do so.

In the example of FIG. 9, three different phases are illustrated and labeled as 1, 2, and 3. Phase 1 represents a design phase where a user or users create a static design 902 within the development environment of the EDA system. Static design 902 is created to include BDCs 904 and 906. BDC 904 has two variants 908, 910. BDC 906 has two variants 912, 914. For purposes of illustration, variants 908, 910, 912, and 914 are synthesis sources or synthesis variants. In the example of FIG. 9, both of BDCs 904, 906 are DFX enabled. That is, the parameter for enabling DFX functionality for each of BDCs 904, 906 is activated or set to 1.

In the non-DFX case, when implementing a synthesis flow or a simulation flow, the EDA system utilizes only the active variant from each respective list for a given BDC. Any variants for a BDC that are inactive may be ignored for purposes of performing a synthesis flow or a simulation flow. In the DFX case, each synthesis variant of the BDC with DFX functionality enabled is processed through the synthesis flow.

In phase 2, the EDA system generates a new set of files in which reconfigurable partitions are generated from the BDCs and reconfigurable modules are generated from the variants. A reconfigurable module is the netlist or HDL description that is implemented within a reconfigurable partition. Multiple reconfigurable modules exist for a reconfigurable partition. A reconfigurable partition refers to an attribute being set on an instantiation that defines the instance as reconfigurable. The reconfigurable partition is the level of hierarchy of a circuit design, having the attribute set, within which different reconfigurable modules are implemented.

As pictured, the EDA system generates the static design 902 and creates a reconfigurable partition 920 from BDC 904. The EDA system generates a reconfigurable partition 922 from BDC 906. The EDA system generates reconfigurable modules 924 and 926 from variants 908 and 910, respectively. Reconfigurable modules 924, 926 are associated with reconfigurable partition 920. Similarly, the EDA system generates reconfigurable modules 928 and 930 from variants 912 and 914, respectively. Reconfigurable modules 928, 930 are associated with reconfigurable partition 922. In phase 2, the EDA system generates a netlist or HDL description for each of the variants to generate the resulting reconfigurable modules.

In phase 2, the boundaries between the dynamic regions (e.g., reconfigurable partitions) and the static region (e.g., the static design 902) are formalized. In phase 2, the EDA system moves each variant into its own file set so that when synthesis is performed, each variant may be synthesized in its own context.

After synthesis, the EDA system generates configurations 940 and 942. Each configuration specifies a particular combination of reconfigurable modules that will be implemented within the target IC at the same time and co-exist with one another. For example, configuration 940 specifies that reconfigurable module 924 is to be implemented in reconfigurable partition 920 concurrently with reconfigurable module 928 being implemented in reconfigurable partition 922. Configuration 942 specifies that reconfigurable module 926 is to be implemented in reconfigurable partition 920 concurrently with reconfigurable module 930 being implemented in reconfigurable partition 922. In terms of the BDCs with DFX functionality enabled, each configuration effectively specifies which variant is the active variant for a given BDC at a different and particular point in time as implemented with the static design.

The synthesis process generates implementation 944 and implementation 946. Implementation 944 represents the synthesized version of reconfigurable module 924 and reconfigurable module 928. Implementation 946 represents the synthesized version of reconfigurable module 926 and reconfigurable module 930. The EDA system may perform the remainder of the design flow (e.g., placement, routing, and configuration bitstream generation) to create a hardware design file 950 from implementations 944 and 946. The EDA system is capable of generating full and partial configuration bitstreams, as contained in hardware design file 950, in a single design flow from the implementations 944 and 946.

In the example of FIG. 9, the EDA system is capable of generating the programmable device images (PDIs). A PDI refers to a file, which includes one or more configuration bitstreams, that is loaded into the target IC for the static region and/or the dynamic region(s). In one aspect, the EDA system is capable of generating the PDI for the static region of the circuit design and one or more PDIs for each dynamic region of the design. The EDA system may generate these various PDIs simultaneously by launching multiple implementation runs in parallel. Each implementation run may be associated with a particular configuration (e.g., configuration 940 and/or 942) that indicates how the reconfigurable partitions are to be filled with specific reconfigurable module (s). In one aspect, the EDA system allows a user to select the default configuration or edit the configurations prior to implementation of the design flow.

By using BDCs for purposes of DFX, any BDC may be marked for DFX functionality. Within the development environment of the EDA system (e.g., in the block design view), the BDC can then be marked as a DFX cell. The partition definition and the reconfigurable modules may be created and displayed in a hierarchical source view like view 106 of FIG. 1. A partition definition defines a set of reconfigurable modules that are associated with a reconfigurable partition. Because the dynamic regions of the design are specified as BDCs, the contents of each dynamic region (e.g., each BDC with DFX functionality enabled) may be viewed in the context of the parent BDC using the expansion feature previously described.

The functionality of the BDC allows different sub-modules of each DFX enabled BDC to be developed by a different user and/or design team. These different sub-designs may then be integrated into the top-level block design by designating the sub-modules as variants of a BDC that may be processed through the design flow illustrated in FIG. 9.

The validation functions available for BDCs may be performed across the different variants of each BDC to ensure that each variant of a given BDC has the same boundary for purposes of DFX. The EDA system is capable of performing the validation functions while the top-level block design is still in block design form in the development environment. This allows for the detection of bugs in the circuit design (e.g., parameter mismatches at BDC and/or block boundaries) at a much earlier stage in the design process as opposed to later during the design flow (e.g., synthesis). This saves significant computational time and allows the designer to address any errors before starting a time consuming and lengthy design flow.

In one or more example implementations, the EDA system is capable of performing parameter propagation on the top-level block design using the active variant of each child BDC. The EDA system determines the boundary parameters of the active variant of each BDC and performs parameter propagation as previously described among the other BDCs.

In using BDCs to support DFX, a user may change the boundary of a BDC. For example, the user may expose a new interface for the active variant of a BDC within the top-level block design by modifying the source block design for the active variant. In that case, refreshing the top-level block design in the development environment causes the newly exposed interface to show up in the top-level block design. The EDA system, for example, in response to detecting the changed boundary of the active variant of the BDC may query the user, via a GUI, for example, whether the user would like to synchronize the boundary of the active variant of the BDC with other variants of the BDC. In response to a user input indicating synchronize, the EDA system is capable of automatically adding the new interface of the active variant to each other variant of the BDC. The EDA system will automatically add the interface to the different source variants of the BDC. This allows the EDA system to ensure that boundaries of different variants for the same BDC remain consistent or the same.

Prior to the use of BDCs for DFX, the boundary of a DFX module (reconfigurable partition and/or reconfigurable module) was defined a priori at the time that the partition or module was created. In using BDCs, one may design the BDC in the normal or usual case of circuit design development as a block design. At any point during that process in the development environment, the user may simply set the parameter to enable DFX functionality of the BDC. The user may toggle the DFX parameter on and off for the BDC as may be desired or needed through the design process. This means that the user may continue to define the boundary of the BDC, with DFX functionality, as the user continues to create the circuit design or BDC. The boundary of the BDC, for purposes of enabling DFX functionality, need not be fixed until significantly later in the design process. For example, the boundary need not be fixed until phase 2 as illustrated in FIG. 9. Until that time, the user may switch a BDC between DFX enabled and disabled modes. In conventional DFX implementations that do not involve BDCs, the boundaries must be fixed much earlier in the design process.

In another aspect, the hardware design file may be provided to software generation tools that support dynamic loading and unloading of the partial device tree for Linux environments to support DFX functionality implemented in a target IC as coupled to a host computing system. The software tools, for example, may generate the necessary device drivers for each of the variants and modifications to the device tree for each of the variants so that the appropriate drivers and device tree modifications are available to the host data processing system for each of the different configurations that may be loaded into the target IC.

In another example implementation, BDCs may be extended to hold other types of design entry files. For example, a BDC may be extended to hold a design checkpoint file, an Electronic Design Interchange Format (EDIF) file, RTL files, RTL modules (e.g., a module reference), and/or IP cores. The created reconfigurable modules generated as shown in FIG. 9 can support holding these various types of sources and pass the sources on to the synthesis and implementation phases for use by other design, implementation, and/or simulation tools.

In the example of FIG. 9, the BDCs with DFX functionality were not nested. In one or more other example implementations, BDCs with DFX functionality may be nested. The nested BDCs may be transformed into hierarchical reconfigurable partitions (e.g., nested reconfigurable partitions).

The use of BDCs for DFX also facilitates third party development of circuit designs in so-called FPGA-as-a-service environments. In a data center environment, for example, where hardware accelerators include programmable ICs, the data center operator or other party may provide a user with the static region of a circuit design as a "shell." The operator or other party may provide the user with a BDC variant. The shell may be encrypted and inaccessible (e.g., unreadable) to the user. The variant may only include the boundary needed to interface with the shell. The user may design the variant using the boundary included therein. The user may design a kernel (e.g., a hardware accelerated function) using the boundary information from the variant. The circuit design for the static region provided by the data center operator or other party may remain secret.

Figure 10:
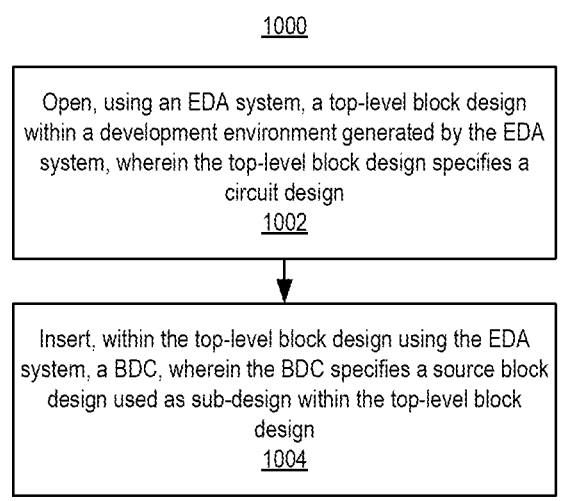
FIG. 10 is a method illustrating certain operative aspects of using BDCs for creating circuit designs.

FIG. 10 is a method 1000 illustrating certain operative aspects of using BDCs for creating circuit designs. Method 1000 may be implemented using an EDA system as described within this disclosure. In block 1002, the EDA system opens a top-level block design within a development environment generated by the EDA system. The top-level block design specifies a circuit design. In block 1004, the EDA system is capable of inserting a BDC within the top-level block design. The BDC specifies a source block design used as a sub-design within the top-level block design.

The foregoing and other implementations can each optionally include one or more of the following features, alone or in combination. Some example implementations include all the following features in combination.

The BDC may be inserted into the top-level block design by instantiating the BDC therein. In one aspect, the EDA system is capable of creating a hierarchy including a plurality of blocks of the top-level block design responsive to a user selection of the plurality of blocks and generating a block design corresponding to the plurality of blocks. The EDA system is also capable of generating the BDC including a link to the block design as the source block design for the BDC and replacing the plurality of blocks in the top-level block design with the BDC.

In another aspect, in response to a user input requesting insertion of an existing block design within the top-level block design, the EDA system is capable of first creating the BDC and adding the existing block design as the source block design for the BDC. Once created, the BDC may be inserted into the top-level block design.

In another aspect, subsequent to the inserting and responsive to a received user input, contents of the BDC may be displayed while the BDC is displayed as part of the top-level block design within the development environment of the EDA system.

For example, a selected BDC may be expanded as illustrated in FIG. 2 to show the contents, e.g., constituent blocks, of the selected BDC.

In another aspect, one or more parameters of the BDC may be propagated into the top-level block design. In another aspect, one or more parameters of the top-level block design may be propagated into the BDC. The parameters may be propagated using a unidirectional technique as described in connection with FIG. 4 or a bidirectional technique as described in connection with FIG. 5. Whether unidirectional or bidirectional parameter propagation is used may depend on the particular parameter being propagated. That is, certain parameters may be automatically propagated using bidirectional propagation while other certain parameters are propagated using unidirectional propagation. Parameter propagation may also depend on boundary lock parameters of the BDCs involved.

In another example implementation, in response to determining that a boundary lock parameter of the BDC is set to lock, the EDA system is capable of preventing any parameters of the top-level block design from propagating to the BDC. The EDA system may prevent any parameters of the BDC boundary or parameters of components internal to the BDC from being changed due to propagation.

In another aspect, in response to detecting a change to the source block design, the EDA system is capable of generating a notification of the change within the development environment and, in response to a user input, synchronizing the change to a copy of the source block design used in the development environment for the BDC.

In another aspect, the BDC is linked with one or more simulation sources for a simulation flow and one or more synthesis sources for a synthesis flow.

In another aspect, an address of one or more IP cores included in the BDC as instantiated in the top-level block design within the development environment may be edited.

In another aspect, the BDC is designated for DFX. The BDC may include a plurality of variants, wherein each variant is processed into a different reconfigurable module and the BDC is processed into a reconfigurable partition. In another aspect, a first variant of the plurality of variants may be associated with an ELF. In that case, the EDA system is capable of automatically associating the ELF with one or more other variants of the plurality of variants of the block design container.

Figure 11:
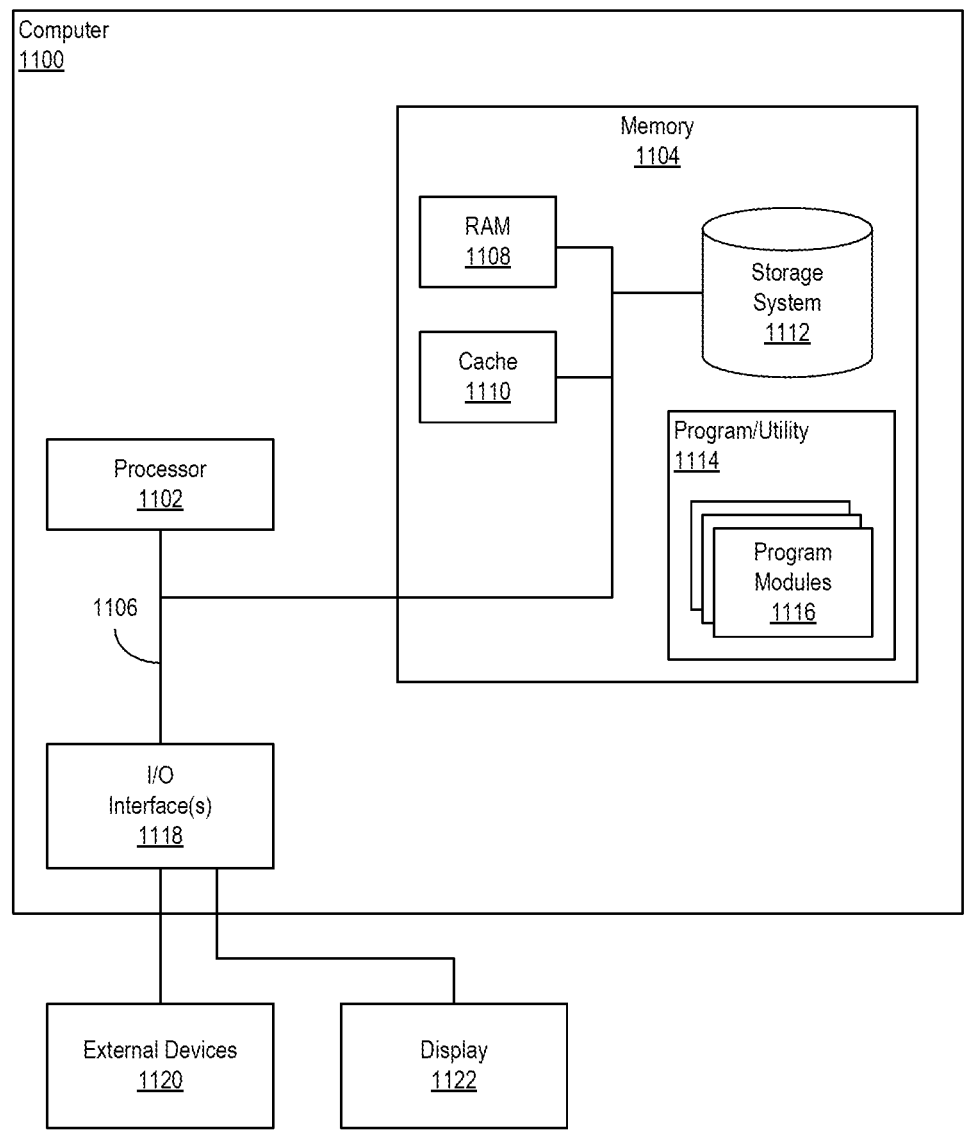
FIG. 11 illustrates an example of a computer system for use with the inventive arrangements described within this disclosure.

FIG. 11 illustrates an example implementation of a computer 1100. The components of computer 1100 can include, but are not limited to, a processor 1102, a memory 1104, and a bus 1106 that couples various system components including memory 1104 to processor 1102. Processor 1102 may be implemented as one or more processors. In an example, processor 1102 is implemented as a central processing unit (CPU). Example processor types include, but are not limited to, processors having an x86 type of architecture (IA-32, IA-64, etc.), Power Architecture, ARM processors, and the like.

Bus 1106 represents one or more of any of a variety of communication bus structures. By way of example, and not limitation, bus 1106 may be implemented as a Peripheral Component Interconnect Express (PCIe) bus. Computer 1100 typically includes a variety of computer system readable media. Such media may include computer-readable volatile and non-volatile media and computer-readable removable and non-removable media.

In the example of FIG. 11, computer 1100 includes memory 1104. Memory 1104 can include computer-readable media in the form of volatile memory, such as random-access memory (RAM) 1108 and/or cache memory 1110. Computer 1100 also can include other removable/non-removable, volatile/non-volatile computer storage media. By way of example, storage system 1112 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1106 by one or more data media interfaces. Memory 1104 is an example of at least one computer program product.

Program/utility 1114, having a set (at least one) of program modules 1116, may be stored in memory 1104. By way of example, program modules 1116 may represent an operating system, one or more application programs, other program modules, and program data. Program modules 1116 generally carry out the functions and/or methodologies of the example implementations described within this disclosure. For example, one or more of program modules 1116 can implement software capable of performing the various operations described within this disclosure upon execution by computer 1100.

Program/utility 1114 is executable by processor 1102. Program/utility 1114 and any data items used, generated, and/or operated upon by computer 1100 are functional data structures that impart functionality when employed by computer 1100.

Computer 1100 may include one or more Input/Output (I/O) interfaces 1118 communicatively linked to bus 1106. I/O interface(s) 1118 allow computer 1100 to communicate with one or more external devices 1120 and/or communicate over one or more networks such as a local area network (LAN), a wide area network (WAN), and/or a public network (e.g., the Internet). Examples of I/O interfaces 1118 may include, but are not limited to, network cards, modems, network adapters, hardware controllers, etc. Examples of external devices also may include a display 1122 and/or other devices such as a keyboard and/or a pointing device that enable a user to interact with computer 1100.

Computer 1100 is only one example implementation of a computer. Computer 1100 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices. The example of FIG. 11 is not intended to suggest any limitation as to the scope of use or functionality of example implementations described herein. Computer 1100 is an example of an EDA system, a data processing system, and/or computer hardware that is capable of performing the various operations described within this disclosure.

In this regard, computer 1100 may include fewer components than shown or additional components not illustrated in FIG. 11 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computer 1100 may be operational with numerous other general-purpose or special-purpose computing system environments or configurations. Examples of computing systems, environments, and/or configurations that may be suitable for use with computer 1100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Some computing environments, e.g., cloud computing environments and/or edge computing environments using computer 1100 or other suitable data processing system, generally support the FPGA-as-a-Service (FaaS) model. In the FaaS model, user functions are hardware accelerated as circuit designs implemented within programmable ICs operating under control of the (host) data processing system. Other examples of cloud computing models are described in the National Institute of Standards and Technology (NIST) and, more particularly, the Information Technology Laboratory of NIST.

Figure 12:
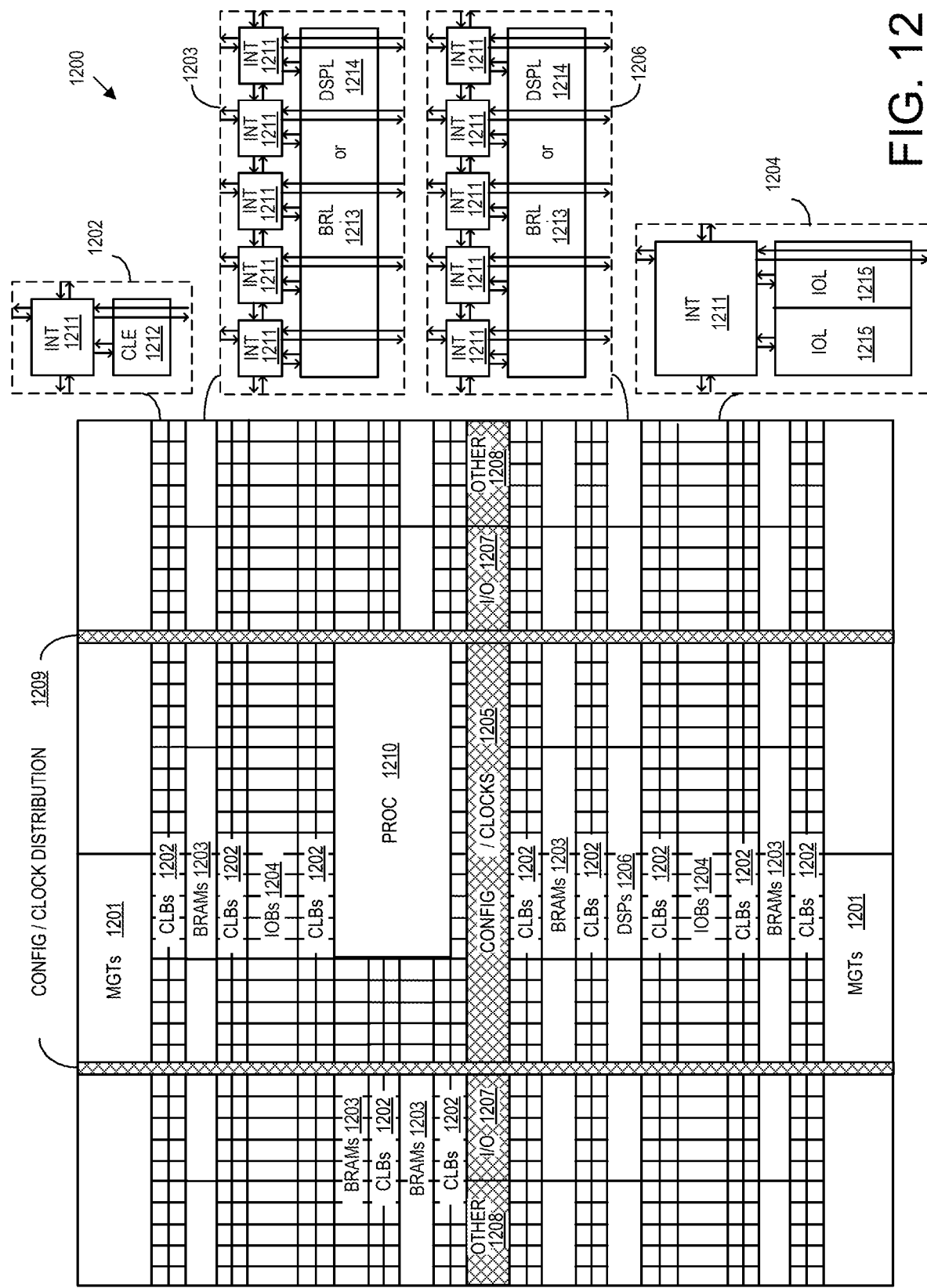
FIG. 12 illustrates an example architecture for an integrated circuit (IC).

FIG. 12 illustrates an example architecture 1200 for an IC. In one aspect, architecture 1200 may be implemented within a programmable IC. For example, architecture 1200 may be used to implement a field programmable gate array (FPGA). Architecture 1200 may also be representative of a system-on-chip (SoC) type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor. A programmable IC is an IC that includes at least some programmable circuitry. The programmable circuitry may include programmable logic.

As shown, architecture 1200 includes several different types of programmable circuit, e.g., logic, blocks. For example, architecture 1200 may include a large number of different programmable tiles including multi-gigabit transceivers (MGTs) 1201, configurable logic blocks (CLBs) 1202, random-access memory blocks (BRAMs) 1203, input/output blocks (IOBs) 1204, configuration and clocking logic (CONFIG/CLOCKS) 1205, digital signal processing blocks (DSPs) 1206, specialized I/O blocks 1207 (e.g., configuration ports and clock ports), and other programmable logic 1208 such as digital clock managers, analog-to-digital converters, system monitoring logic, and so forth.

In some ICs, each programmable tile includes a programmable interconnect element (INT) 1211 having standardized connections to and from a corresponding INT 1211 in each adjacent tile. Therefore, INTs 1211, taken together, implement the programmable interconnect structure for the illustrated IC. Each INT 1211 also includes the connections to and from the programmable logic element within the same tile, as shown by the examples included at the right of FIG. 12.

For example, a CLB 1202 may include a configurable logic element (CLE) 1212 that may be programmed to implement user logic plus a single INT 1211. A BRAM 1203 may include a BRAM logic element (BRL) 1213 in addition to one or more INTs 1211. Typically, the number of INTs 1211 included in a tile depends on the height of the tile. As pictured, a BRAM tile has the same height as five CLBs, but other numbers (e.g., four) also may be used. A DSP tile 1206 may include a DSP logic element (DSPL) 1214 in addition to an appropriate number of INTs 1211. An 10B 1204 may include, for example, two instances of an I/O logic element (IOL) 1215 in addition to one instance of an INT 1211. The actual I/O pads connected to IOL 1215 may not be confined to the area of IOL 1215.

In the example pictured in FIG. 12, the shaded area near the center of the die, e.g., formed of regions 1205, 1207, and 1208, may be used for configuration, clock, and other control logic. Shaded areas 1209 may be used to distribute the clocks and configuration signals across the breadth of the programmable IC.

Some ICs utilizing the architecture illustrated in FIG. 12 include additional logic blocks that disrupt the regular columnar structure making up a large part of the IC. The additional logic blocks may be programmable blocks and/or dedicated circuitry. For example, a processor block depicted as PROC 1210 spans several columns of CLBs and BRAMs.

In one aspect, PROC 1210 may be implemented as dedicated circuitry, e.g., as a hardwired processor, that is fabricated as part of the die that implements the programmable circuitry of the IC. PROC 1210 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1210 may be omitted from architecture 1200 and replaced with one or more of the other varieties of the programmable blocks described. Further, such blocks may be utilized to form a "soft processor" in that the various blocks of programmable circuitry may be used to form a processor that can execute program code as is the case with PROC 1210.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 12 that are external to PROC 1210 such as CLBs 1202 and BRAMs 1203 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1210.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 1210 or a soft processor. In some cases, architecture 1200 includes a dedicated configuration processor that loads the configuration bitstream to the appropriate configuration memory and/or processor memory. The dedicated configuration processor does not execute user-specified program code. In other cases, architecture 1200 may utilize PROC 1210 to receive the configuration bitstream, load the configuration bitstream into appropriate configuration memory, and/or extract program code for execution.

FIG. 12 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 12 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1210 within the IC are for purposes of illustration only and are not intended as limitations.

A system as described herein in connection with FIG. 11, for example, is capable of processing a circuit design having undergone the processing described herein for implementation within an IC having an architecture the same as or similar to that of FIG. 12. The system, for example, is capable of synthesizing, placing, and routing the circuit design. The system may also perform bitstream generation so that the bitstream may be loaded into the IC, thereby physically implementing the circuit design within the IC.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined within this disclosure, the term "data structure" means a physical implementation of data within a physical memory. As such, a data structure is formed of specific electrical or magnetic structural elements in a memory. A data structure imposes physical organization on the data stored in the memory as used by an application program executed using a processor.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "data processing system" means one or more hardware systems configured to process data, each hardware system including at least one processor programmed to initiate operations and memory.

As defined herein, the term "processor" means at least one circuit capable of carrying out instructions contained in program code. The circuit may be an integrated circuit or embedded in an integrated circuit.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block designs of methods, apparatus (systems), and computer program products. It will be understood that each block of the flowchart illustrations and/or block designs, and combinations of blocks in the flowchart illustrations and/or block designs, may be implemented by computer readable program instructions, e.g., program code.

These computer readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block design block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block design block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block design block or blocks.

The flowchart and block designs in the Figures illustrate the architecture, functionality, and operation of possible implementations of systems, methods, and computer program products according to various aspects of the inventive arrangements. In this regard, each block in the flowchart or block designs may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block designs and/or flowchart illustration, and combinations of blocks in the block designs and/or flowchart illustration, may be implemented by special purpose hardware-based systems that perform the specified functions or acts or carry out combinations of special purpose hardware and computer instructions.

What is claimed is:

1. A method, comprising:
opening, using an Electronic Design Automation (EDA) system, a top-level block design within a development environment generated by the EDA system, wherein the top-level block design specifies a circuit design;
inserting, within the top-level block design and using the EDA system, a block design container;
wherein the block design container includes a list of a plurality of linked variants, wherein each linked variant corresponds to a different block design specifying a different selectable and alternative subsystem for implementation within the top-level block design in place of the block design container for performing a synthesis flow;
receiving a user input selecting a linked variant from the list of the plurality of linked variants as a selected linked variant; and
generating, by performing the synthesis flow using the selected linked variant to implement the block design container, a synthesized version of the circuit design.

2. The method of claim 1, wherein the inserting comprises:
creating a hierarchy including a plurality of blocks;
generating a selected block design corresponding to the plurality of blocks;
generating the block design container, wherein the plurality of linked variants includes the selected block design; and
including the block design container within the top-level block design.

3. The method of claim 1, wherein the inserting comprises:
responsive to a user input requesting inclusion of an existing block design within the top-level block design, first creating the block design container and adding the existing block design to the list as one of the plurality of linked variants for the block design container.

4. The method of claim 1, comprising:
subsequent to the inserting and responsive to receiving a further user input, displaying contents of the block design container while the block design container is displayed as part of the top-level block design within the development environment of the EDA system.

5. The method of claim 1, comprising:
propagating one or more parameters of the block design container into the top-level block design.

6. The method of claim 1, comprising:
propagating one or more parameters of the top-level block design into the block design container.

7. The method of claim 1, comprising:
in response to determining that a boundary lock parameter of the block design container is set to lock, preventing any parameters of the top-level block design from propagating to the block design container.

8. The method of claim 1, comprising:
in response to detecting a change to a selected block design corresponding to a selected linked variant of the block design container, generating a notification of the change within the development environment; and in response to a further user input, synchronizing the change to a copy of the selected block design used in the development environment for the block design container.

9. The method of claim 1, wherein the plurality of linked variants include sources for simulation flows that correspond to respective ones of the block designs, wherein the sources for the simulation flows are selectable independently of the block designs for synthesis.

10. The method of claim 1, comprising:
editing an address of one or more Intellectual Property (IP) cores included in the block design container as instantiated in the top-level block design within the development environment.

11. The method of claim 1, wherein the block design container is designated for dynamic function exchange.

12. The method of claim 11, wherein each linked variant is processed into a different reconfigurable module and the block design container is processed into a reconfigurable partition.

13. The method of claim 12, wherein a first variant of the plurality of variants is associated with an executable and linkable file (ELF), the method comprising:
automatically associating the ELF with one or more other variants of the plurality of variants of the block design container.

14. A system, comprising:
a processor configured to initiate operations including:
opening, within a development environment generated by the system, a top-level block design specifying a circuit design;
inserting, within the top-level block design within the development environment, a block design container;
wherein the block design container includes a list of a plurality of linked variants, wherein each linked variant corresponds to a different block design specifying a different selectable and alternative subsystem for implementation within the top-level block design in place of the block design container for performing a synthesis flow;
receiving a user input selecting a linked variant from the list of the plurality of linked variants as a selected linked variant; and
generating, by performing the synthesis flow using the selected linked variant to implement the block design container, a synthesized version of the circuit design.

15. The system of claim 14, wherein the processor is configured to initiate operations further comprising:
subsequent to the inserting and responsive to receiving a further user input, displaying contents of the block design container while the block design container is displayed as part of the top-level block design within the development environment.

16. The system of claim 14, wherein the processor is configured to initiate operations further comprising:
propagating one or more parameters of the block design container into the top-level block design.

17. The system of claim 14, wherein the processor is configured to initiate operations further comprising:
propagating one or more parameters of the top-level block design into the block design container.

18. The system of claim 14, wherein the processor is configured to initiate operations further comprising:
in response to detecting a change to a selected block design corresponding to a selected linked variant of the block design container, generating a notification of the change within the development environment; and in response to further a user input, synchronizing the change to a copy of the selected block design used in the development environment for the block design container.

19. The system of claim 14, wherein the plurality of linked variants include sources for simulation flows that correspond to respective ones of the block designs, wherein the sources for the simulation flows are selectable independently of the block designs for synthesis.

20. The system of claim 14, wherein the block design container is designated for dynamic function exchange, each linked variant is processed into a different reconfigurable module, and the block design container is processed into a reconfigurable partition.

* * * * *